(12) United States Patent
Shotton et al.

(10) Patent No.: US 9,262,673 B2
(45) Date of Patent: Feb. 16, 2016

(54) HUMAN BODY POSE ESTIMATION

(71) Applicant: Microsoft Corporation, Redmond, WA (US)

(72) Inventors: Jamie Daniel Joseph Shotton, Cambridge (GB); Andrew William Fitzgibbon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 13/902,506

(22) Filed: May 24, 2013

(65) Prior Publication Data

US 2013/0266182 A1  Oct. 10, 2013

Related U.S. Application Data

(63) Continuation of application No. 12/454,628, filed on May 20, 2009, now Pat. No. 8,503,720.

(60) Provisional application No. 61/174,878, filed on May 1, 2009.

(51) Int. Cl.
*G06K 9/00* (2006.01)

(52) U.S. Cl.
CPC ........ *G06K 9/00335* (2013.01); *G06K 9/00369* (2013.01)

(58) Field of Classification Search
CPC .......... G06K 9/00369; G06K 9/00335; G06K 9/00342; A63F 13/06; A63F 13/10; A63F 2300/1043; A63F 2300/1081; A63F 2300/1087; A63F 2300/6045; H04N 7/183; G03B 17/54; G03B 21/14; G03B 35/00; G03B 35/08; G06F 3/005; G06F 3/011; G06F 3/017

See application file for complete search history.

(56) References Cited

U.S. PATENT DOCUMENTS

| | | | |
|---|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

"Virtual High Anxiety", Tech Update, Aug. 1995, pp. 22.

(Continued)

*Primary Examiner* — Tom Y Lu
(74) *Attorney, Agent, or Firm* — Gregg Wisdom; Judy Yee; Micky Minhas

(57) ABSTRACT

Techniques for human body pose estimation are disclosed herein. Depth map images from a depth camera may be processed to calculate a probability that each pixel of the depth map is associated with one or more segments or body parts of a body. Body parts may then be constructed of the pixels and processed to define joints or nodes of those body parts. The nodes or joints may be provided to a system which may construct a model of the body from the various nodes or joints.

20 Claims, 15 Drawing Sheets

(56) References Cited

U.S. PATENT DOCUMENTS

| | | |
|---|---|---|
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,392 A | 7/1999 | Ho |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,756 B1 | 5/2004 | Toyama |
| 6,765,726 B1 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,879,709 B2 | 4/2005 | Tian |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |

(56) References Cited

U.S. PATENT DOCUMENTS

| | | |
|---|---|---|
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,290,249 B2 * | 10/2012 | Mathe et al. ................. 382/154 |
| 2004/0207597 A1 | 10/2004 | Marks |
| 2005/0059488 A1 | 3/2005 | Larsen et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0217676 A1 | 9/2007 | Grauman |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0137956 A1 | 6/2008 | Yang |
| 2008/0152191 A1 | 6/2008 | Fujimura et al. |
| 2008/0152218 A1 | 6/2008 | Okada |
| 2008/0215972 A1 | 9/2008 | Zalewski et al. |
| 2008/0215973 A1 | 9/2008 | Zalewski et al. |
| 2009/0141933 A1 | 6/2009 | Wagg |
| 2009/0167679 A1 | 7/2009 | Klier et al. |
| 2009/0221368 A1 | 9/2009 | Yen et al. |
| 2010/0093435 A1 | 4/2010 | Glaser et al. |
| 2010/0197393 A1 * | 8/2010 | Geiss ............................ 463/30 |
| 2012/0194516 A1 | 8/2012 | Newcombe et al. |
| 2012/0196679 A1 | 8/2012 | Newcombe et al. |

FOREIGN PATENT DOCUMENTS

| | | |
|---|---|---|
| JP | 08044490 A | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Aggarwal et al., "Human Motion Analysis: A Review", IEEE Non-rigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Wren et al., "Pfinder: Real-Time Tracking of the Human Body", MIT Media Laboratory Perceptual Computing Section Technical Report

(56) References Cited

OTHER PUBLICATIONS

No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

Qian et al., "A Gesture-Driven Multimodal Interactive Dance System", Jun. 2004, pp. 1579-1582, IEEE International Conference on Multimedia and Expo (ICME), Taipei, Taiwan.

Thayananthan et al., "Pose Estimation and Tracking Using Multivariate Regression," Elsevier, http://svr-www.eng.cam.ac.uk/~bdrs2/papers/thayananthan_prl08.pdf, Oct. 8, 2007, pp. 1-15.

Laxton, B., "Monocular Human Pose Estimation," University of California, San Diego, http://vision.ucsd.edu/~blaxton/pagePapers/laxton_researchExam2007.pdf, downloaded Jun. 26, 2009, 16 pages.

Navaratnam et al., "Hierarchical Part-Based Human Body Pose Estimation," http://mi.eng.cam.ac.uk/reports/svr-ftp/navaratnam_hierarchical.pdf, downloaded Jun. 1, 2009, pp. 1-10.

Kanaujia et al., "Semi-Supervised Hierarchical Models for 3D Human Pose Reconstruction," Rutgers University and TTI-Chicago, http://www.cs.toronto.edu/~crismin/PAPERS/Smi-cvpr07.pdf, downloaded Jun. 1, 2009, pp. 1-8.

Zhong, Y., "A Weighting Scheme for Content-Based Image Retrieval," University of Wollongong, http://www.library.uow.edu.au/adt-NWU/uploads/approved/adt-NWU20080116.091123/public/01Front.pdf, 2007, 13 pages.

Agarwal et al., "Learning Methods for Recovering 3D Human Pose from Monocular Images," Technical Report 5333, INRIA Rhone-Alpes, Oct. 2004, pp. 1-25.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

"International Search Report & Written Opinion for PCT Patent Application No. PCT/US2014/016749", Mailed Date: May 12, 2014, Filed Date: Feb. 18, 2014, 8 Pages.

Daniel, et al., "Pose Tracking from Natural Features on Mobile Phones", In IEEE/ACM International Symposium on Mixed and Augmented Reality, Sep. 15, 2008, pp. 125-134.

Breiman, Leo, "Random Forests", In Machine Learning, vol. 45, Issue 1, Oct. 2001, pp. 5-32.

Veas, et al., "Creating Meaningful Environment Models for Augmented Reality", In IEEE Virtual Reality Conference, Mar. 8, 2008, pp. 295-296.

* cited by examiner

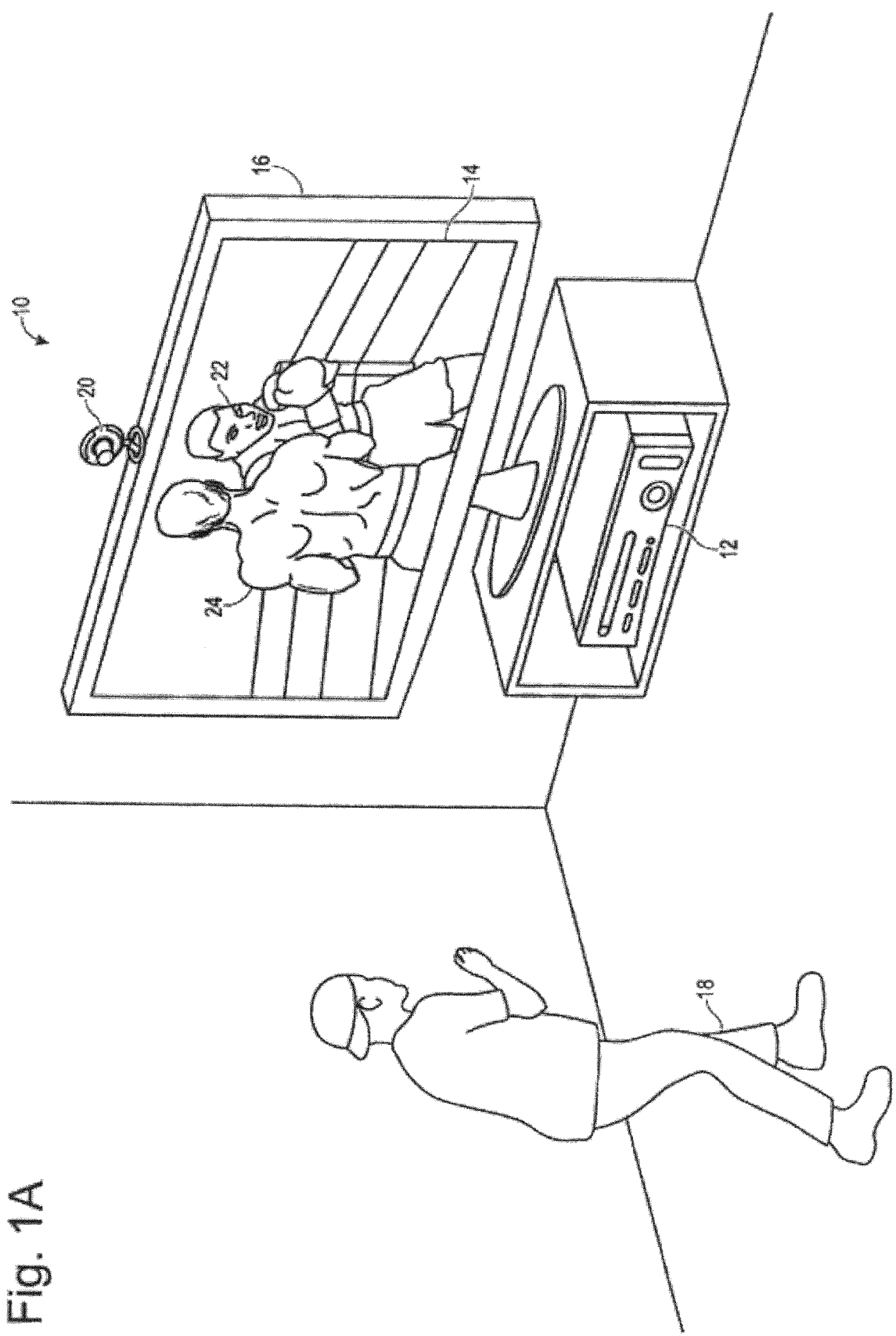

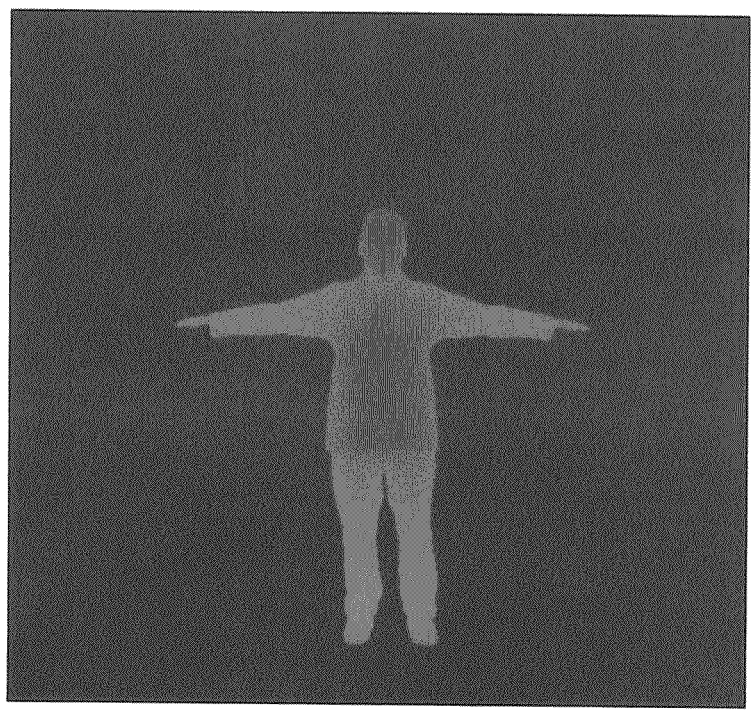
550
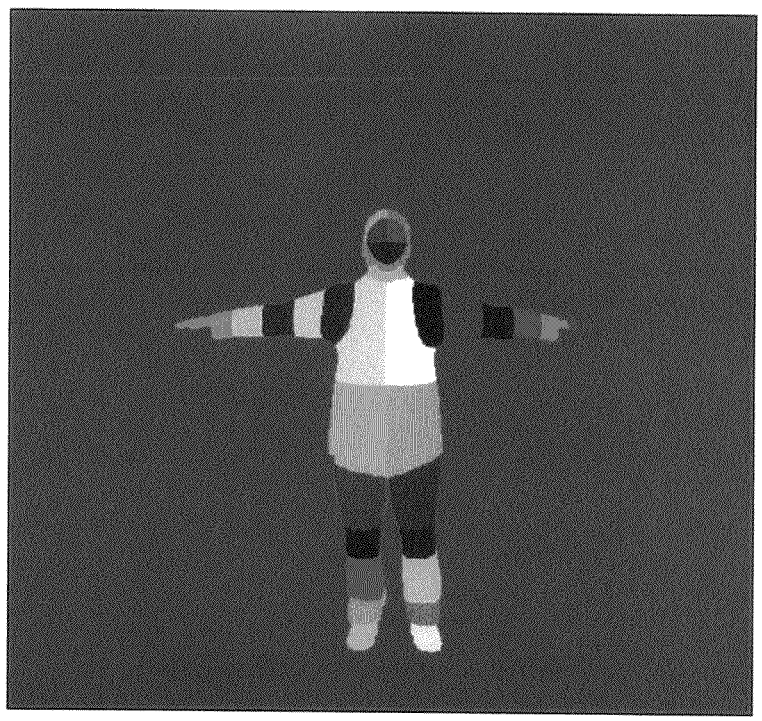
552
FIG. 10

HUMAN BODY POSE ESTIMATION

CROSS REFERENCE TO RELATED APPLICATIONS

This application is a continuation of U.S. patent application Ser. No. 12/454,628 filed May 20, 2009 which claims the benefit of U.S. Provisional Application No. 61/174,878, titled "Human Body Pose Estimation" filed May 1, 2009. Each of which is hereby incorporated by references in its entirety.

BACKGROUND

In a typical computing environment, a user has an input device such as a keyboard, a mouse, a joystick or the like, which may be connected to the computing environment by a cable, wire, wireless connection or the like. If control of a computing environment were to be shifted from a connected controller to gesture or pose based control, the system will need effective techniques to be able to determine what poses or gestures a person is making Interpreting gestures or poses in a tracking and processing system without knowing the pose of a user's body may cause the system to misinterpret commands, or to miss them all together.

Further, a user of a tracking and processing system may stand at one of various different possible angles with respect to a capture device, and the user's gesture may appear differently to the capture device depending upon the particular angle of the user with respect to the capture device. For example, if the capture device is unaware that the user is not directly facing the capture device, then the user extending his arm directly forward could possibly be misinterpreted by the capture device as the user extending his arm partially to the left or the right. Thus, the system may not work properly without body pose estimation.

Accordingly, there is a need for technology that allows a tracking and processing system to determine the position of a user's body, and to therefore better interpret the gestures that the user is makes.

SUMMARY

Techniques for human body pose estimation are disclosed herein. Depth map images from a depth camera may be processed to calculate a probability that each pixel of the depth map is associated with one or more segments or body parts of a body. Body parts may then be constructed of the pixels and processed to define joints or nodes of those body parts. The nodes or joints may be provided to a system which may construct a model of the body from the various nodes or joints.

In an embodiment, a first pixel of a depth map may be associated with one or more body parts of one or more users. Association with a body part may mean that there is a high probability that the first pixel is located within the body part. This probability may be determined by measuring the background depth, the depth of the first pixel, and the depth of various other pixels around the first pixel.

The location and angle at which various other pixels around the first pixel may be measured for depth may be determined by a feature test training program. In one embodiment, each time the depth at a pixel is measured, a determination of whether the pixel is within the depth range of the body is made. Based on the determination, the distance and angle for the next test pixel may be provided. Selecting the test pixels in such a way may increase the efficiency and robustness of the system.

Body poses, which may include pointing, xyz coordinates, joints, rotation, area, and any other aspects of one or more body parts of user may be estimated for multiple users. In an embodiment, this may be accomplished by assuming a user segmentation. For example, values may be assigned to an image such that a value 0 represents background, value 1 represents user 1, value 2 represents user 2, etc. Given this player segmentation image, it is possible to classify all user 1 pixels and do a three dimensional centroid finding, and then repeat this process for subsequent users. In another embodiment, background subtraction may be performed and the remaining foreground pixels (belonging to the multiple users) may then be classified as associated with one or more body parts. In a further embodiment, the background may be considered another 'body part' and every pixel in the frame may be considered and associated with one or more body parts, including the background. When computing centroids, it may be ensured that each centroid is spatially localized, so that a respective body part is present for each user. The centroids may then be combined into coherent models by, for example, connecting neighboring body parts throughout each user's body.

In an embodiment, after one or more initial body part probabilities are calculated for each pixel, the initial probabilities for each pixel may be compared with the initial probabilities of one or more offset adjacent pixels to further refine the probability calculations. For example, if the initial probabilities suggest that adjacent pixels are in the same or adjacent body parts (i.e., head and neck), then this would increase the probabilities of the initial calculations. By contrast, if the initial probabilities suggest that adjacent pixels are in non-adjacent body parts (i.e., head and foot), then this would decrease the probabilities of the initial calculations.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

The systems, methods, and computer readable media for body pose estimation in accordance with this specification are further described with reference to the accompanying drawings in which:

FIGS. 1A, 1B, and 1C illustrate an example embodiment of a target recognition, analysis, and tracking system with a user playing a game.

FIG. 10 depicts an example embodiment of a segmented body used in body pose estimation.

DETAILED DESCRIPTION OF ILLUSTRATIVE EMBODIMENTS

As will be described herein, a tracking and processing system determine body pose estimation. When a user makes a gesture or pose, a tracking and processing system may receive the gesture or pose and associate one or more commands with the user. In order to determine what response to provide the user of a computing environment, the system may need to be able to determine the body pose of the user. Body poses may also be used to determine skeletal models, determine the location of particular body parts and the like.

In an example embodiment, a tracking and processing system is provided with a capture device, wherein the capture device comprises a depth camera. The depth camera may capture a depth map of an image scene. The computing environment may perform one or more processes on the depth map to assign pixels on the depth map to segments of the users body. From these assigned body parts, the computing environment may obtain nodes, centroids or joint positions of the body parts, and may provide the nodes, joints or centroids to one or more processes to create a 3-D model of the body pose. In one aspect, the body pose is the three dimensional location of the set of body parts associated with a user. In another aspect, pose includes the three dimensional location of the body part, as well as the direction it is pointing, the rotation of the body segment or joint as well as any other aspects of the body part or segment.

Figure 1B:
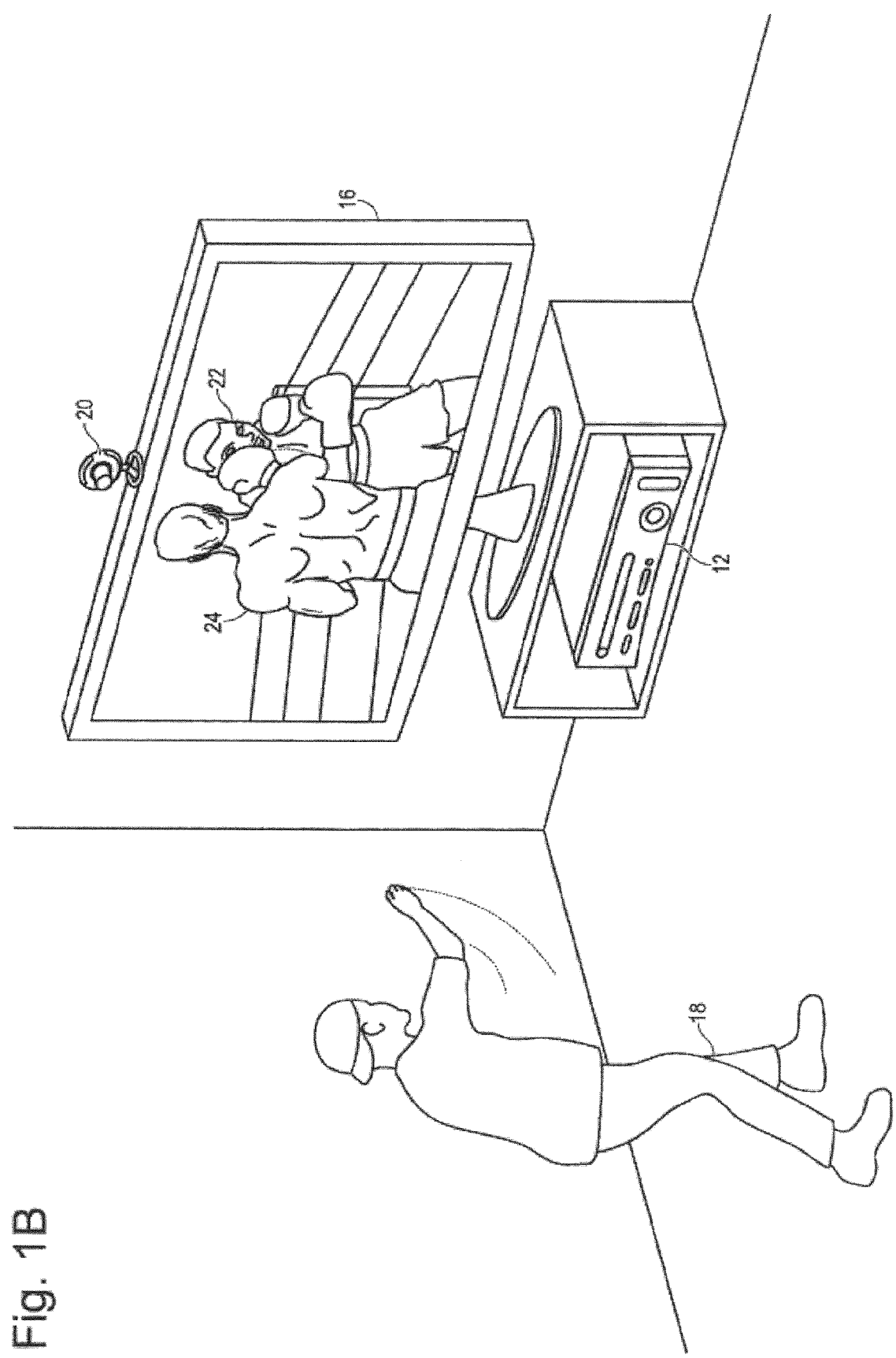

FIGS. 1A and 1B illustrate an example embodiment of a configuration of a tracking and processing system 10 utilizing body pose estimation with a user 18 playing a boxing game. In an example embodiment, the tracking and processing system 10 may be used to, among other things, determine body pose, bind, recognize, analyze, track, associate to a human target, provide feedback, interpret poses or gestures, and/or adapt to aspects of the human target such as the user 18.

As shown in FIG. 1A, the tracking and processing system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the tracking and processing system 10 may further include a capture device 20. The capture device 20 may be, for example, a detector that may be used to monitor one or more users, such as the user 18, such that poses performed by the one or more users may be captured, analyzed, processed, and tracked to perform one or more controls or actions within an application, as will be described in more detail below.

According to one embodiment, the tracking and processing system 10 may be connected to an audiovisual device 16 such as a television, a monitor, a high-definition television (HDTV), or the like that may provide game or application visuals and/or audio to the user 18. For example, the computing environment 12 may include a video adapter such as a graphics card and/or an audio adapter such as a sound card that may provide audiovisual signals associated with the feedback about virtual ports and binding, game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, a wireless connection or the like.

As shown in FIGS. 1A and 1B, the tracking and processing system 10 may be used to recognize, analyze, process, determine the pose of, and/or track a human target such as the user 18. For example, the user 18 may be tracked using the capture device 20 such that the position, movements and size of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a user avatar 24 that the user 18 may control with his or her movements on a screen 14. For example, as shown in FIG. 1B, the user 18 may throw a punch in physical space to cause the user avatar 24 to throw a punch in game space. Thus, according to an example embodiment, the computer environment 12 and the capture device 20 of the tracking and processing system 10 may be used to recognize and analyze the punch of the user 18 in physical space such that the punch may be interpreted as a game control of the user avatar 24 in game space.

The user 18 may be associated with a virtual port in computing environment 12. Feedback of the state of the virtual port may be given to the user 18 in the form of a sound or display on audiovisual device 16, a display such as an LED or light bulb, or a speaker on the computing environment 12, or any other means of providing feedback to the user. The feedback may be used to inform a user when he is in a capture area of capture device 20, if he is bound to the tracking and processing system 10, what virtual port he is associated with, and when he has control over an avatar such as avatar 24. Gestures and poses by user 18 may change the state of the system, and thus the feedback that the user receives from the system.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the user avatar 24. For example, the user may use movements to enter, exit, turn system on or off, pause, volunteer, switch virtual ports, save a game, select a level, profile or menu, view high scores, communicate with a friend, etc. Additionally, a full range of motion of the user 18 may be available, used, and analyzed in any suitable manner to interact with an application.

Figure 1C:
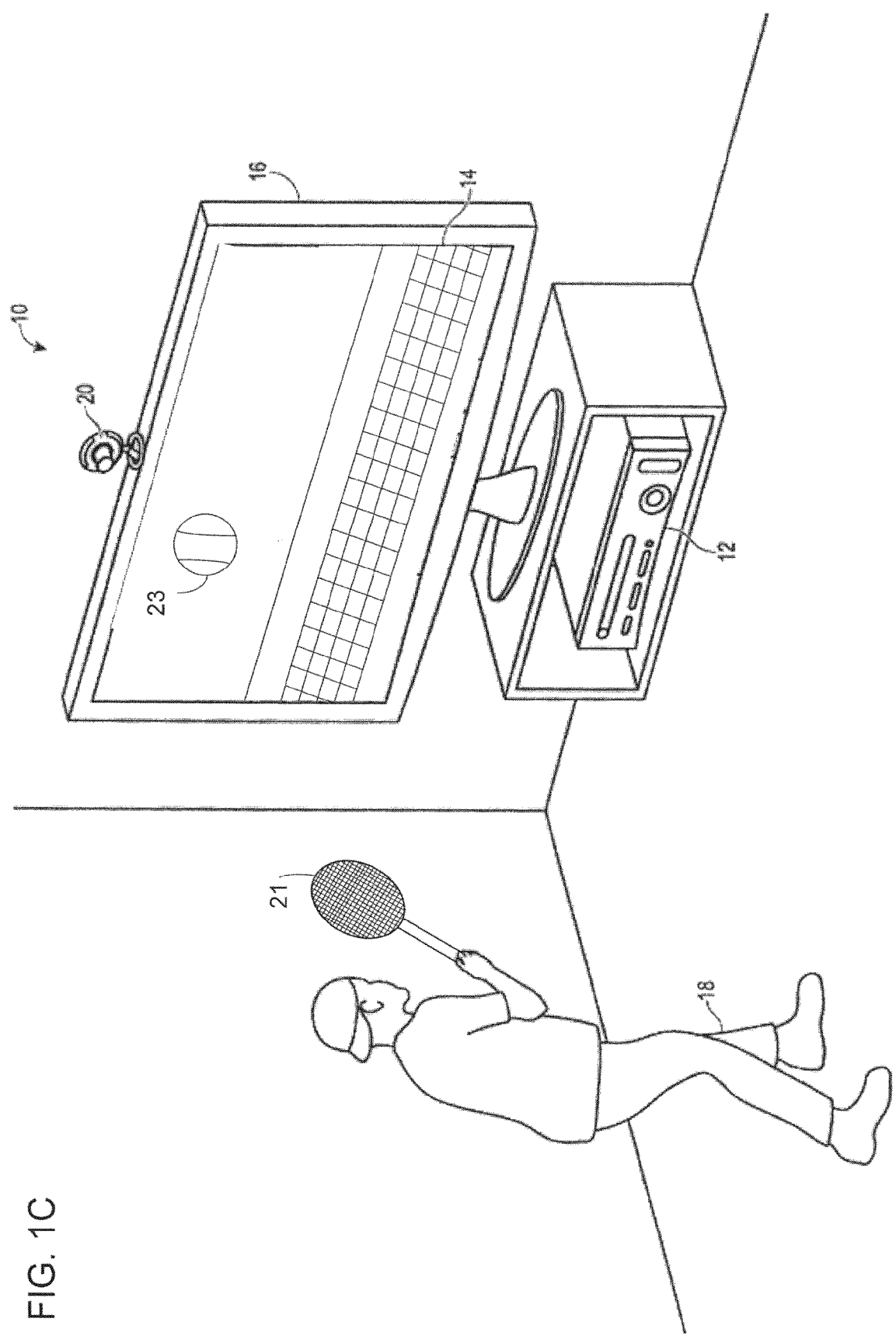

In FIG. 1C, the human target such as the user 18 may have an object such as racket 21. In such embodiments, the user of an electronic game may be holding the object such that the motions of the user and the object may be used to adjust and/or control parameters of the game, such as, for example, hitting an onscreen ball 23. The motion of a user holding a racket 21 may be tracked and utilized for controlling an on-screen racket in an electronic sports game. In another example embodiment, the motion of a user holding an object may be tracked and utilized for controlling an on-screen weapon in an electronic combat game. Any other object may also be included, such as one or more gloves, balls, bats, clubs, guitars, microphones, sticks, pets, animals, drums and the like.

According to other example embodiments, the tracking and processing system 10 may further be used to interpret target movements as operating system and/or application controls that are outside the realm of games. For example, virtually any controllable aspect of an operating system and/or application may be controlled by movements of the target such as the user 18.

Figure 2:
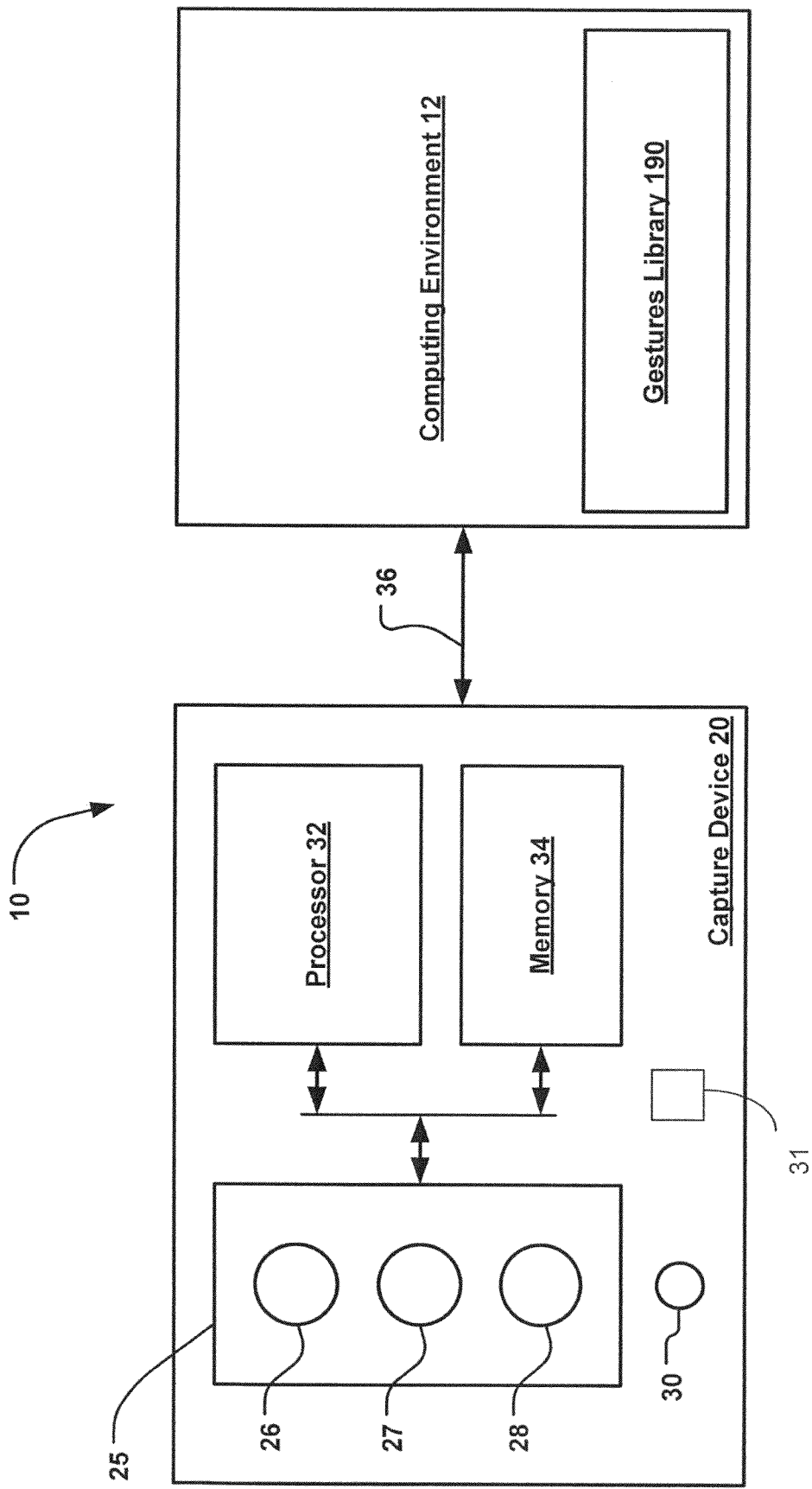
FIG. 2 illustrates an example embodiment of a capture device that may be used in a target recognition, analysis, and tracking system.

As shown in FIG. 2, according to an example embodiment, the image camera component 25 may include an IR light component 26, a three-dimensional (3-D) camera 27, and an RGB camera 28 that may be used to capture the depth image of a scene. For example, in time-of-flight analysis, the IR light component 26 of the capture device 20 may emit an infrared light onto the scene and may then use sensors (not shown) to detect the backscattered light from the surface of one or more targets and objects in the scene using, for example, the 3-D camera 27 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 26. Upon striking the surface of one or more targets or objects in the scene, the pattern may become deformed in response. Such a deformation of the pattern may be captured by, for example, the 3-D camera 27 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information. Depth may also be determined by capturing images using one or more detectors that may be monochromatic, infrared, RGB or any other type of detector and performing a parallax calculation.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the tracking and processing system 10. Additionally, the microphone 30 may be used to receive audio signals that may also be provided by the user to control applications such as game applications, non-game applications, or the like that may be executed by the computing environment 12.

The capture device 20 may further include a feedback component 31. The feedback component 31 may comprise a light such as an LED or a light bulb, a speaker or the like. The feedback device may perform at least one of changing colors, turning on or off, increasing or decreasing in brightness, and flashing at varying speeds. The feedback component 31 may also comprise a speaker which may provide one or more sounds or noises as a feedback of one or more states. The feedback component may also work in combination with computing environment 12 or processor 32 to provide one or more forms of feedback to a user by means of any other element of the capture device, the tracking and processing system or the like.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, determining the body pose, or any other suitable instruction.

The capture device 20 may further include a memory component 34 that may store the instructions that may be executed by the processor 32, images or frames of images captured by the 3-D camera or RGB camera, user profiles or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 27 and/or the RGB camera 28, and a skeletal model that may be generated by the capture device 20 or the computing environment to the computing environment 12 via the communication link 36. The computing environment 12 may then use the skeletal model, depth information, and captured images to, for example, create a virtual screen, adapt the user interface and control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 27 and device 20 in the form of the skeletal model and movements associated with it may be compared to the gesture filters in the gesture library 190 to identify when a user (as represented by the skeletal model) has performed one or more gestures. Those gestures or poses may be associated with various controls of an application. Thus, the computing environment 12 may use the gestures library 190 to interpret movements of the skeletal model and to control an application based on the movements.

Figure 3:
FIG. 3 depicts an example embodiment of a depth image.

FIG. 3 illustrates an example embodiment of a depth image 60 that may be received by the tracking and processing system and/or the computing environment. According to an example embodiment, the depth image 60 may be an image or frame of a scene captured by, for example, the 3-D camera 27 and/or the RGB camera 28 of the capture device 20 described above with respect to FIG. 2. As shown in FIG. 3, the depth image 60 may include a human target 62 and one or more non-human targets 64 such as a wall, a table, a monitor, or the like in the captured scene. As described above, the depth image 60 may include a plurality of observed pixels where each observed pixel has an observed depth value associated therewith. For example, the depth image 60 may include a two-dimensional (2-D) pixel area of the captured scene where each pixel in the 2-D pixel area may represent a depth value such as a length or distance in, for example, centimeters, millimeters, or the like of a target or object in the captured scene from the capture device.

According to one embodiment, a depth image such as depth image 60 or an image on an RGB camera such as camera 28, or an image on any other detector may be processed and used to determine the shape and size of a target. In another embodiment, the depth image 60 may be used to determine the body pose of a user. The body may be divided into a series of segments and each pixel of a depth map 60 may be assigned a probability that it is associated with each segment. This information may be provided to one or more processes which may determine the location of nodes, joints, centroids or the like to determine a skeletal model and interpret the motions of a user 62 for pose or gesture based command.

Referring back to FIG. 2, in one embodiment, upon receiving the depth image, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to size a virtual screen on a user as described above.

Figure 4:
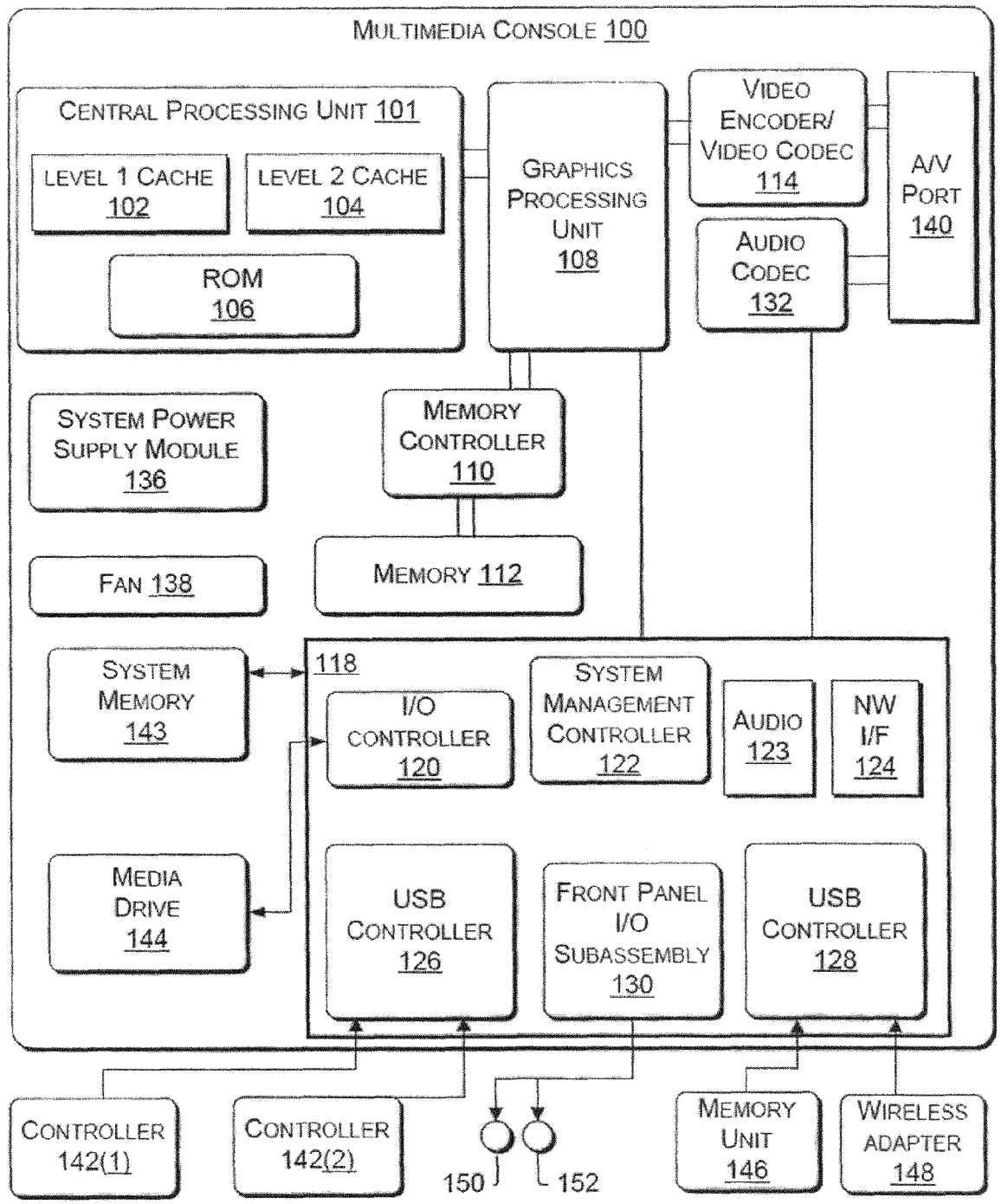
FIG. 4 illustrates an example embodiment of a computing environment that may be used to interpret one or more poses or gestures in a body pose estimation system.

FIG. 4 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus as well as to the CPU. The video processing pipeline outputs data to an AN (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The front panel I/O subassembly 130 may include LEDs, a visual display screen, light bulbs, a speaker or any other means that may provide audio or visual feedback of the state of control of the multimedia control 100 to a user 18. For example, if the system is in a state where no users are detected by capture device 20, such a state may be reflected on front panel I/O subassembly 130. If the state of the system changes, for example, a user becomes bound to the system, the feedback state may be updated on the front panel I/O subassembly to reflect the change in states.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 5:
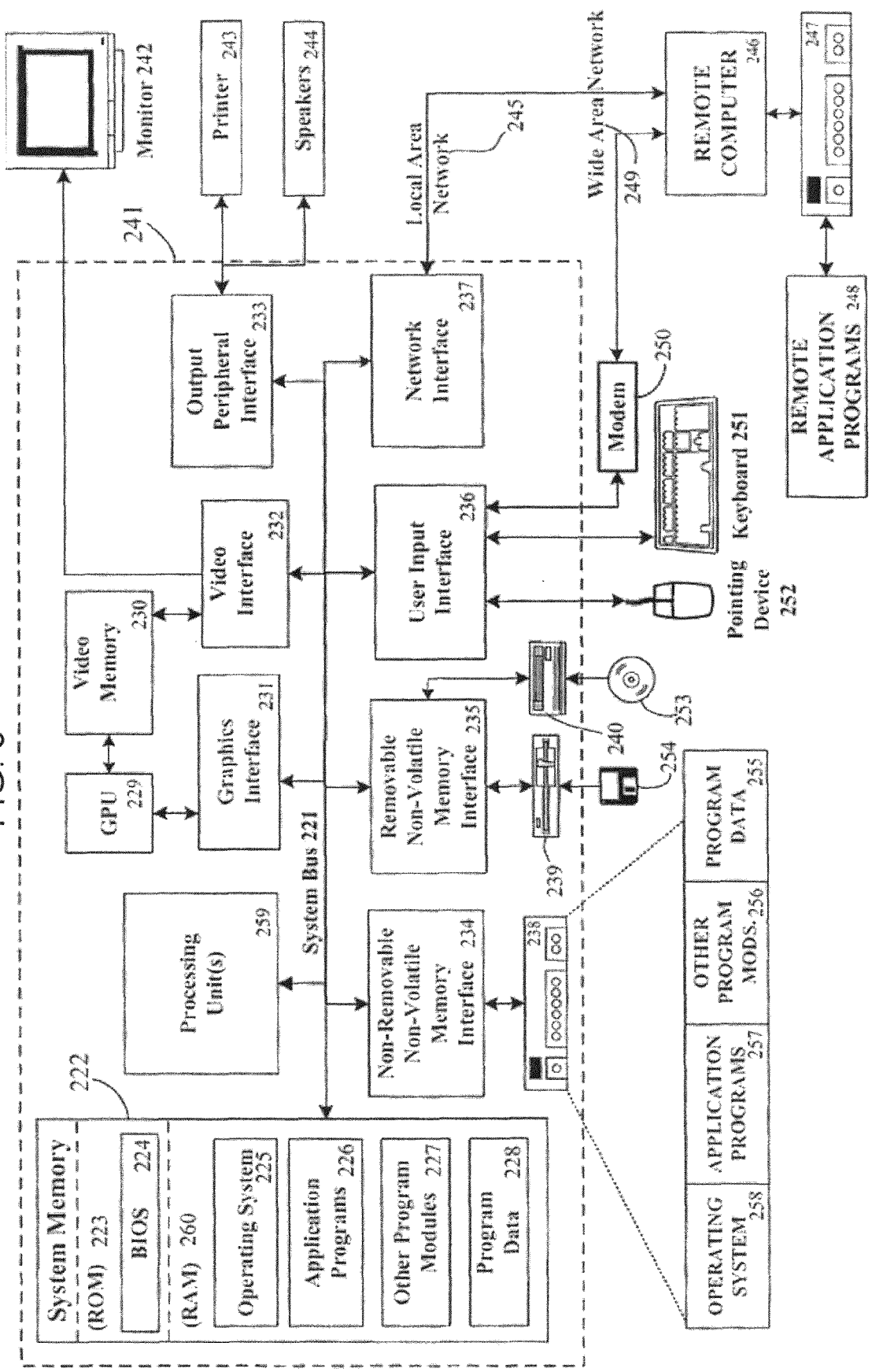
FIG. 5 illustrates another example embodiment of a computing environment that may be used to interpret one or more poses or gestures in a body pose estimation system.

FIG. 5 illustrates another example embodiment of a computing environment that may be the computing environment 12 shown in FIGS. 1A-2 used to interpret one or more poses or gestures in a tracking and processing system. The computing system environment of FIG. 5 is only one example of a suitable computing environment and is not intended to suggest any limitation as to the scope of use or functionality of the presently disclosed subject matter. Neither should the computing environment 12 be interpreted as having any dependency or requirement relating to any one or combination of components illustrated in the exemplary operating environment of FIG. 5. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function (s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 5, the computing environment comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates remote application programs 248 as residing on memory device 247. It will be appreciated that the network connections shown are exemplary and other means of establishing a communications link between the computers may be used.

Figure 6:
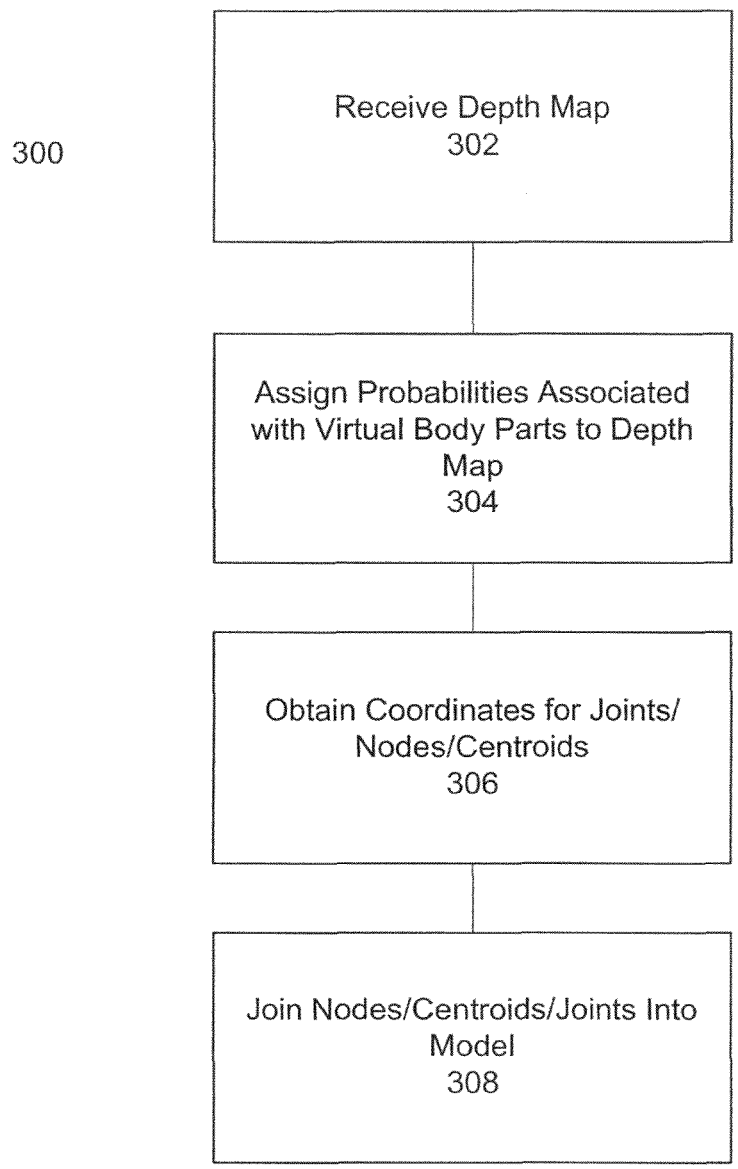
FIG. 6 depicts a flow diagram of an example method for body pose estimation.

FIG. 6 depicts a block diagram 300 whereby body pose estimation may be performed. In one embodiment, at 302, a depth map such as depth map 60 may be received by the tracking and processing system. Probabilities associated with one or more virtual body parts may be assigned to pixels on a depth map at 304. A centroid may be calculated for sets of associated pixels associated with a virtual body part, which may be a node, joint or centroid at 306. Centroids may be representations of joints or nodes of a body, and may be calculated using any mathematical algorithm, including, for example, averaging the coordinates of every pixel in a depth map having a threshold probability that it is associated with a body part, or, as another example, a linear regression technique. At 308, the various nodes, joints or centroids associated with the body parts may be combined into a model, which may be provided to one or more programs in a tracking and processing system. The model may include not only the location in three dimensions of the joints or body parts, but may also include the rotation of a joint or any other information about the pointing of the body part.

Body poses may be estimated for multiple users. In an embodiment, this may be accomplished by assuming a user segmentation. For example, values may be assigned to an image such that a value 0 represents background, value 1 represents user 1, value 2 represents user 2, etc. Given this player segmentation image, it is possible to classify all user 1 pixels and do a centroid finding, and then repeat this process for subsequent users. In another embodiment, background subtraction may be performed and the remaining foreground pixels (belonging to the multiple users) may then be classified. When computing centroids, it may be ensured that each centroid is spatially localized, so that a respective body part is present for each user. The centroids may then be combined into coherent models by, for example, connecting neighboring body parts throughout each user's body.

Figure 7:
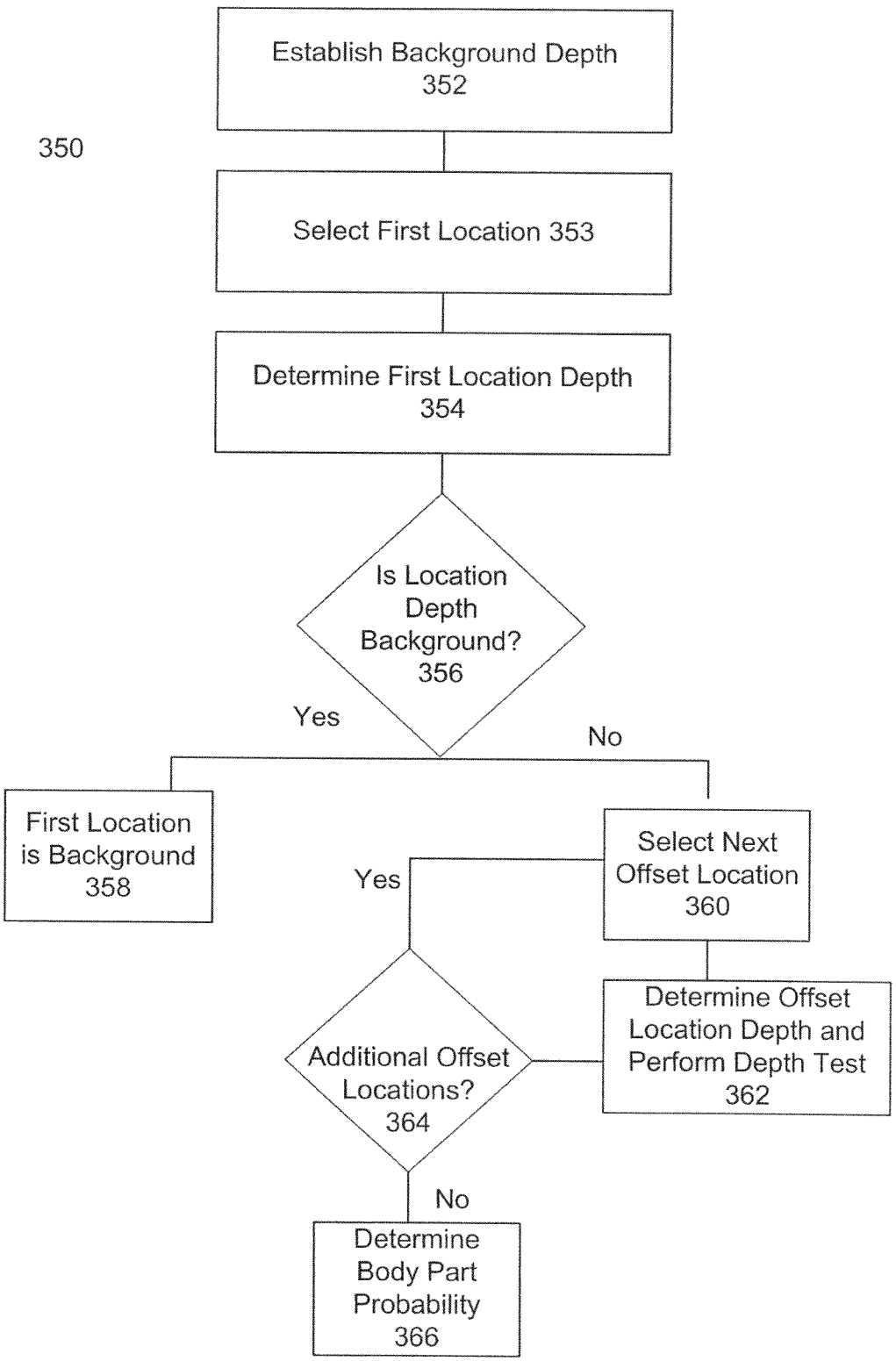
FIG. 7 depicts a flow diagram of an example depth feature test.

FIG. 7 depicts a sample flow chart for assigning probabilities associated with virtual body parts to a depth map. In an example embodiment, the process of FIG. 7 may be performed at 304 of FIG. 6. Process 350 may employ a depth map received at 302 to assign probabilities associated with virtual body parts at 304. One or more background depths on a depth map may be established at 352. For example, one background depth may correspond to a wall in the back of a room, other background depths may correspond to other humans or objects in the room. These background depths may be used later in flowchart of FIG. 7 to determine if a pixel on the depth map is part of a particular user's body or whether the pixel may be associated with the background.

At 353, a first location may be selected in the depth map. The depth of the first location may be determined at 354. At 356, the depth of the first location may be compared with one or more background depths. If the first location depth is at the same or within a specified threshold range of a background depth, then, at 358, the first location is determined to be part of the background and not part of any body parts. If the first location is not at or within a specified threshold range of a background depth, an offset location, referenced with respect to the first location, may be selected at 360. At 362, the depth of the offset location may be determined and a depth test may be performed to determine if the offset location is background. At 354, it is determined whether any additional offset locations are desired.

The determination of whether or not to select additional offset locations, as well as the angle and distance of the additional offset locations from the first location, may be made based in part on the depth of the previous offset location(s) with respect to the first location and/or the background. These determinations may also be made based on additional factors such as the training module described below. In one embodiment, the offsets will scale with depth. For example, if a user is very close to a detector in a capture area, depth may be measured at large offset distances from the first pixel. If the user were to move twice as far from a detector, then the offset distances may decrease by a factor of two. In one embodiment, this scaling causes the depth offset tests to be invariant. Any number of offset locations may be selected and depth tested, after which a probability that the first location is associated with one or more body parts is calculated at 366. This calculation may be based in part on the depth of the first location and the offset locations with respect to the one or more background depths. This calculation may also be made based on additional factors such as the training module described below.

In another embodiment, 352 may not be performed. In this embodiment, each pixel in a depth map is examined for depth at 354, and then the method proceeds directly to choosing offset locations at 360. In such an example, every pixel in a depth map may be examined for depth or for the probability that it is associated with one or more body parts and/or background. From the determinations made at the first pixel and the offset locations, probabilities may be associated with one or more pixels.

Figure 8:
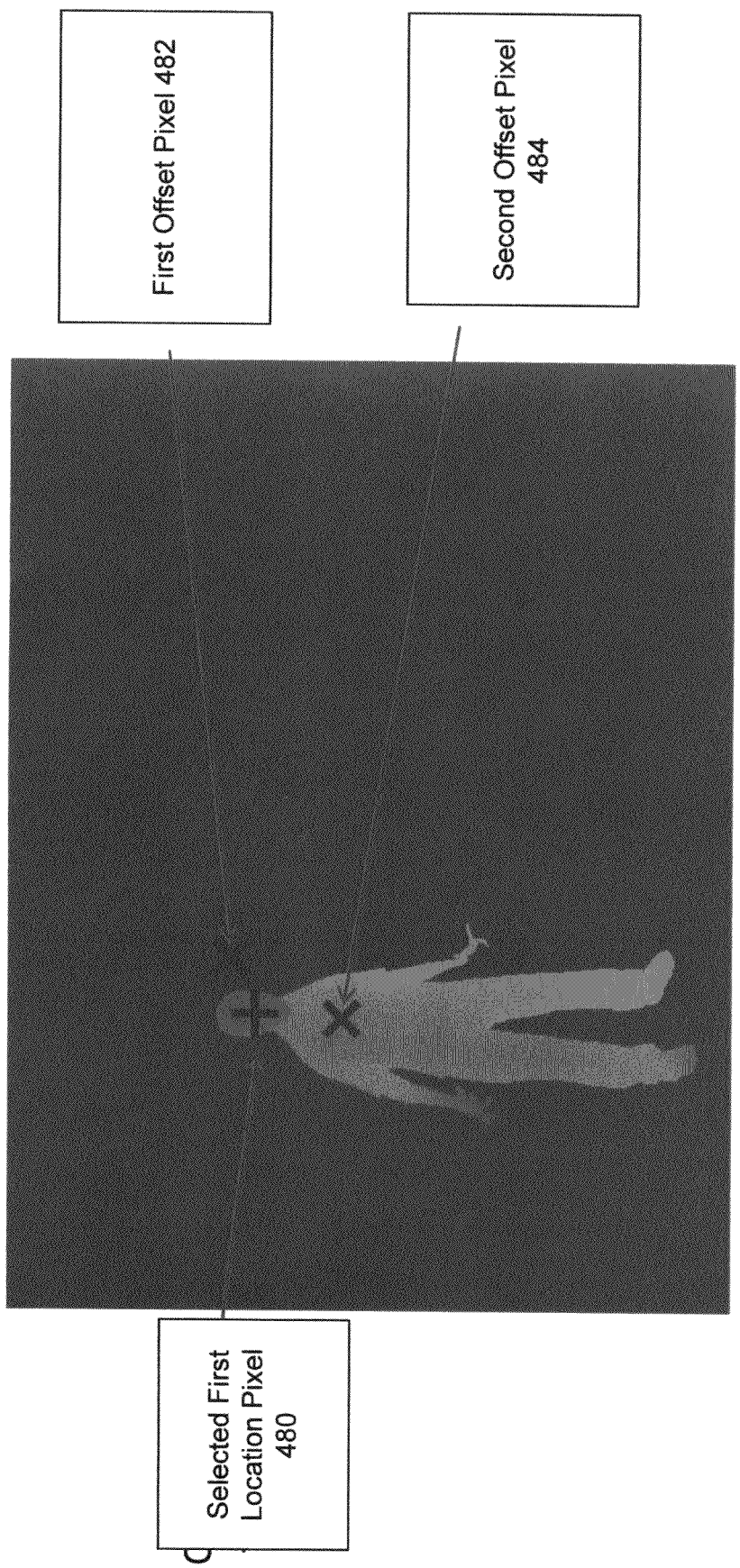
FIG. 8 depicts an example embodiment of pixels measured in a depth feature/probability test.

FIG. 8 depicts an instance of the flow chart referenced in FIG. 7. In the flow chart of FIG. 7, a series of feature tests may be used to determine the probability that a pixel in a depth map is associated with one or more body parts. A first location pixel is selected at 480. A first offset pixel is examined at 482, and a second offset pixel is examined at 484. As more pixels are examined for depth, the probability that a particular pixel is associated with a part of the body may decrease or increase. This probability may be provided to other processes in a tracking and processing system.

In another example depicted by FIG. 8, a first location pixel of a depth map is selected at 480, wherein the depth map has probabilities that each pixel in the depth map is associated with one or more body parts already assigned to each pixel. A second offset pixel is examined for its associated probability at 484. As more pixels are examined for their associated probabilities, a second pass at the probability associated with the first pixel may provide a more accurate determination of the body part associated with the pixel. This probability may be provided to other processes in a tracking and processing system.

Figure 9:
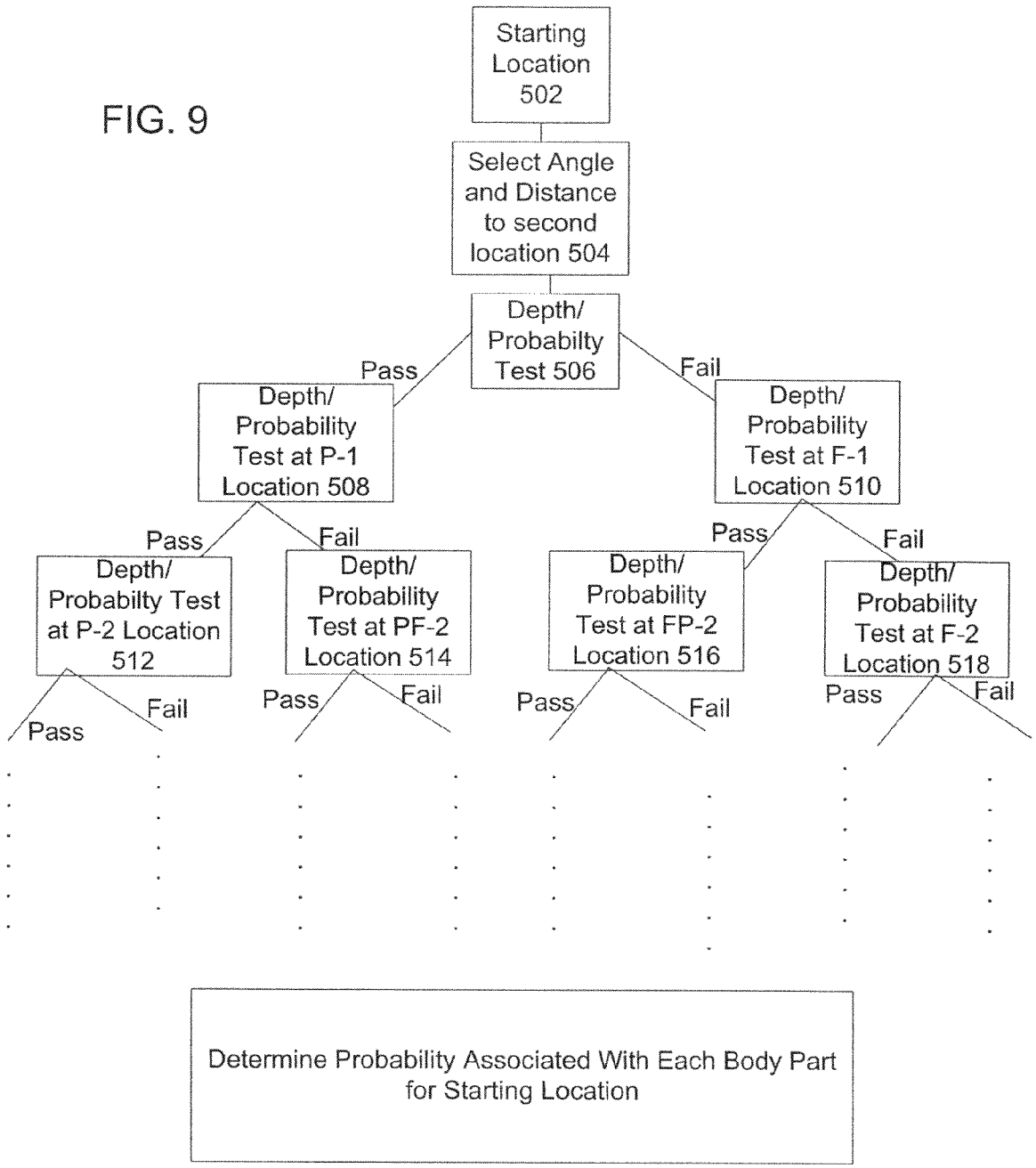
FIG. 9 depicts a flow diagram of an example embodiment of a depth feature/probability test tree.

FIG. 9 depicts a flow chart of another example implementation of feature testing in body pose estimation. A depth map is received and a first pixel location is selected at 502. This may be the pixel depicted at FIG. 8 as the first location. If the first pixel is at the background depth, then probabilities associated with each body part may be zero. If, however, the first pixel is not at the background depth, an angle and distance to a second pixel may be selected at 504.

In another embodiment, a background depth is not determined, instead depth tests and the surrounding offset depth tree tests may be performed at each pixel, regardless of its depth.

In another embodiment, the depth map received at 502 already has the probability that each pixel is associated with one or more body parts assigned to each pixel. Accordingly, instead of testing depth at the first pixel and at offset locations, the probabilities may be tested.

A depth/probability test may be performed on the second pixel at 506. If the second pixel fails the depth/probability test (i.e. it is at the background depth/probability, the depth/probability of a second user, not within the range of a users body or the like) then location F-1 is selected at 510. If, however, the second pixel passes the depth/probability test (i.e. it is within a threshold of the body depth/probability), then location P-1 is selected at 508. Depth/probability tests will then be performed on third pixels at 508 or 510, and based on whether the third pixels pass or fail the depth/probability test, other pixel locations will be selected at one of 512, 514, 516 or 518. While these locations may, in some cases, be the same, they may also vary widely in location based on the results of the depth/probability tests.

In an example embodiment, depth/probability tests on any number of pixels may be performed with reference to a single pixel. For example, 16 tests may be performed, where each depth/probability test is at a different pixel. By performing some quantity of depth/probability tests, the probability that a pixel is associated with each body part may be assigned to each pixel. As another example, only one test may need to be performed on a particular pixel in order to determine the probability that it is associated with one or more body parts.

FIG. 10 depicts an example image that may come from a capture device, such as capture device 20, a graphics package, or other 3-D rendering along with a segmented body image of the example image. Original image 550 may be may be a depth map or other image from the capture device. In an example embodiment, the image of a body may be segmented into many parts as in segmented image 552, and each pixel in a depth map may be associated with a probability for each of the segments in FIG. 10. This probability may be determined using the methods, processes and systems described with respect to FIGS. 7, 8 and 9.

Figure 11:
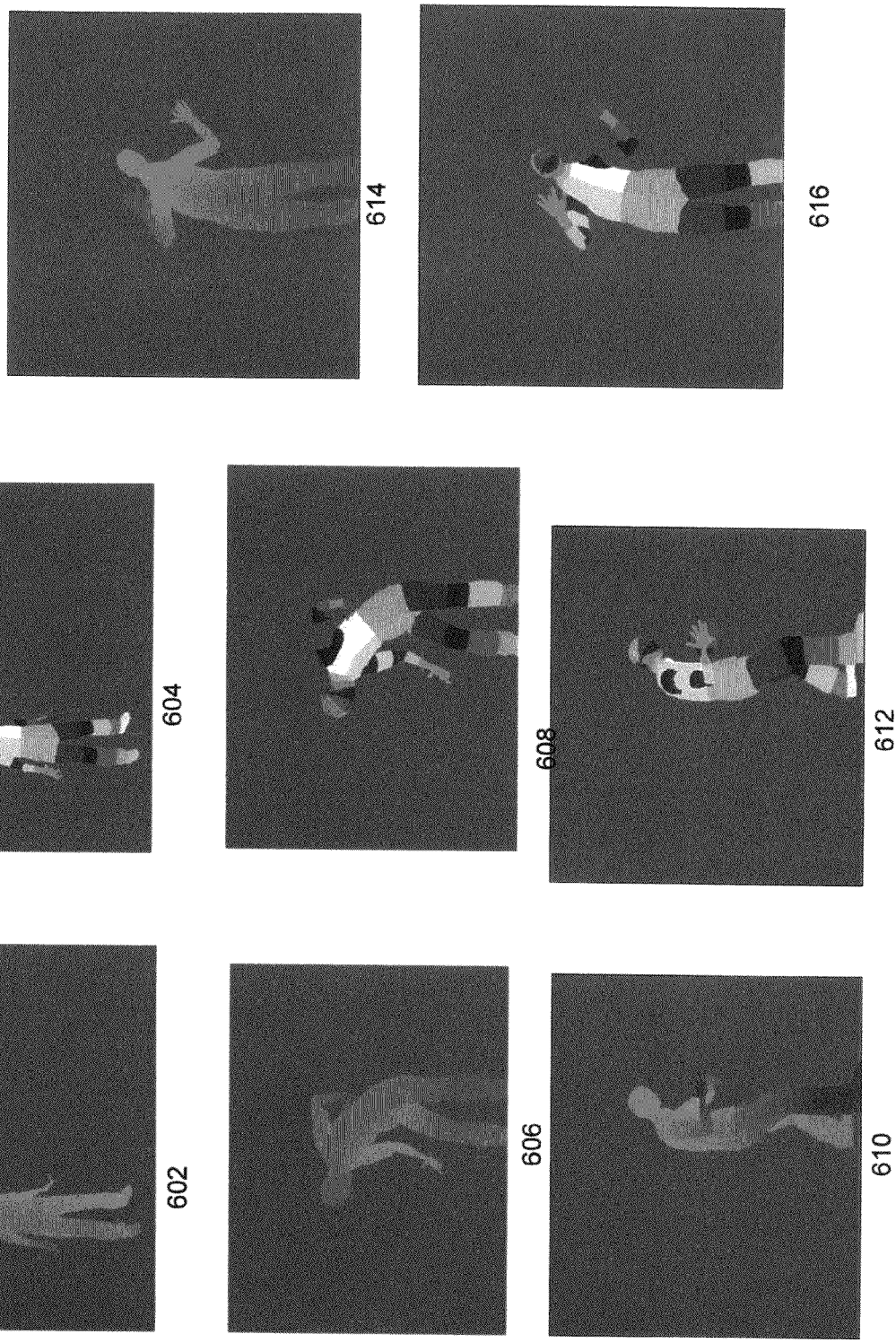
FIG. 11 depicts example embodiments of poses of a user and corresponding segmented images which may be used in a training program to create feature tests.

FIG. 11 depicts a series of images of poses from one or more users. For each pose, an image that may be received from a capture device such as capture device 20 is shown adjacent to an image of the pose that has been segmented into parts.

In a first embodiment, the tracking and processing system may receive the non-segmented images 602, 606, 610, and 614, and use the processes described at FIGS. 7, 8 and 9 to determine the probability that each pixel in the image is associated with each of the segmented body parts. The purpose of the processes described in FIGS. 7, 8 and 9 may be to segment the body into each of the parts shown at 604, 608, 612 and 616. These segmented parts may be used by one or more computer processes to determine the body pose of the user.

In a second embodiment, these images may be used in a feature test training module to determine the feature test of FIGS. 7, 8, and 9. Recall from FIGS. 7, 8, and 9 that a depth test may be performed on a pixel, and it either passes or fails, and based on the pass or fail, a next location will be selected. In one embodiment, the next location selected is not arbitrary, but is selected based on a training module. A training module may involve inputting a volume of thousands, hundreds of thousands, millions or any number of segmented poses such as those shown in FIG. 11 into a program. The program may perform one or more operations on the volume of poses to determine optimal feature tests for each pass or fail for the full volume, or some selection of poses. This optimized series of feature tests may be known as feature test trees.

A volume of poses input into a feature test training module may not contain every possible pose by a user. Further, it may increase the efficiency of the program to create several feature test training modules, each of which are based on a separate volume of body poses. Accordingly, the feature tests at each step of a feature test tree may be different and the final probabilities associated with each segment of a body at the conclusion of a test tree may also be different. In one embodiment, several feature test trees are provided for each pixel and the probabilities output from each test tree may be averaged or otherwise combined to provide a segmented image of a body pose.

Figure 12:
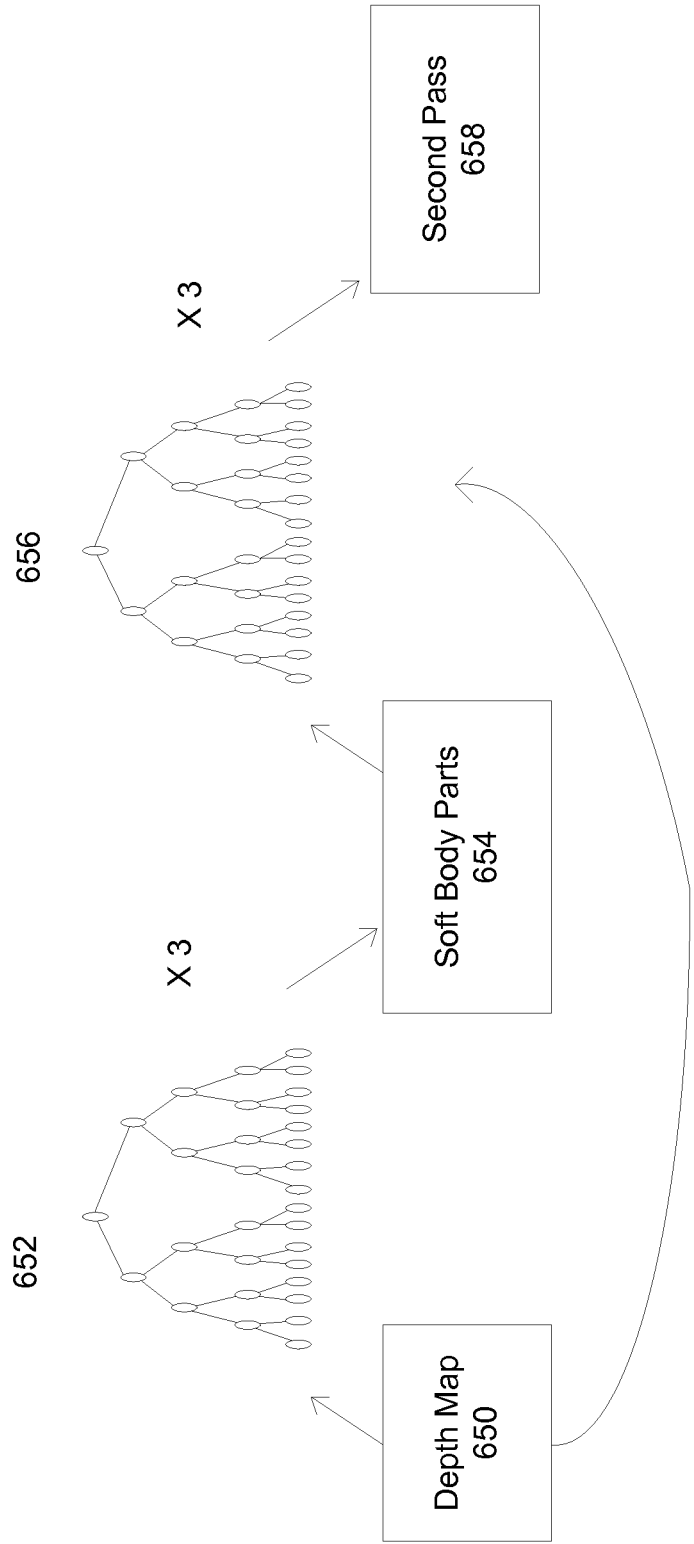
FIG. 12 depicts an example embodiment of assigning probabilities associated with body parts using multiple feature tests.

FIG. 12 depicts an example flow chart to determine body segment probabilities associated with each pixel in human body pose estimation. At 650 a depth map such as the depth map shown in FIG. 3 may be received from a capture device 20. This depth map may be provided to a series of feature test trees at 652. In FIG. 12, three feature test trees, each having been trained on a different volume of body poses, test each pixel of a depth map. The probability that each pixel is associated with each segment of the body is determined at 654 as the soft body parts. In an example embodiment, the process stops here and these probabilities may be used to obtain the joints/nodes/centroids of FIG. 6 at 306.

In another embodiment, at 656, the depth map may again be provided to a series of feature test trees, each of which may have been created using a different volume of body pose images. In FIG. 12, this second series of feature tests contains three trees, each of which may output a probability for each pixel of the depth map associated with each segment of a body. At 658, the probabilities from the second set of feature test trees 656 and the soft body parts from 654 may be combined by averaging or some other method to determine the second pass of the body parts. FIG. 12 shows two sets of three feature test trees, however, the number of feature test trees is not limited by the number three, nor are the number of passes limited by FIG. 12. There may be any number of feature test trees and any number of passes.

In another embodiment, at 656, the depth map provided to the series of feature test trees may have the probability that each pixel of a depth map is associated with one or more body parts already associated with each pixel. For example, the probability maps determined by the feature test trees at 652 may be provided to the feature test trees at 656. In such a circumstance, instead of depth test training programs and trees, the system instead utilizes probability test training programs and trees. The number of trees and passes is not limited in any way, and the trees may be any combination of depth and probability feature tests.

Figure 13:
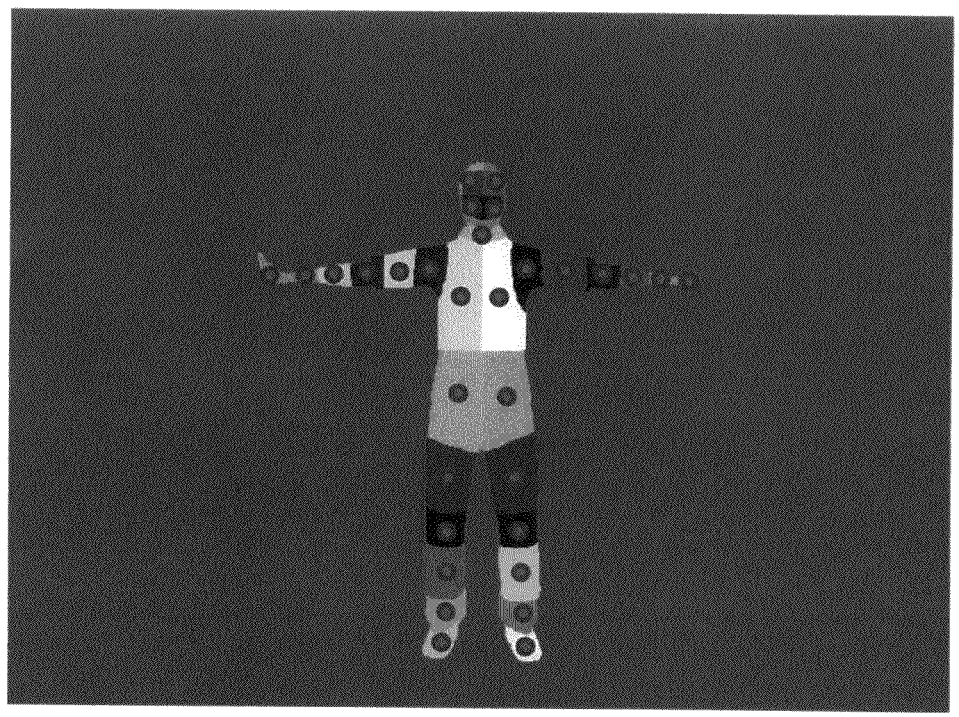
FIG. 13 depicts an example embodiment of centroids/joints/nodes of body parts in body pose estimation.

FIG. 13 depicts a segmented body pose image wherein each segment contains a node/joint/centroid, such as those described at 306 with reference to FIG. 6. These joints/nodes/centroids may be determined by taking the centroid of all of the pixels associated with a body part segment after performing the feature tests of FIGS. 7, 8, 9, and 12. Other methods may also be used to determine the location of the nodes/centroids/joints. For example, a filtering process may remove outlying pixels or the like, after which a process may take place to determine the location of the joints/nodes/centroids.

The joints/nodes/centroids of FIG. 13 may be used to construction a skeletal model, or otherwise represent the body pose of a user. This model may be used by the tracking and processing system in any way, including determining the commands of one or more users, identifying one or more users and the like.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or properties disclosed herein, as well as equivalents thereof.

What is claimed:

1. A method for determining a position of at least part of a body, the method comprising:
    receiving, at a computing system, a depth image that includes the at least part of the body;
    determining, at the computing system, that a first pixel in the depth image corresponds to the at least part of the body; and
    determining, at the computing system, that a second pixel in the depth image corresponds to the at least part of the body based on an angle and a distance of the second pixel relative to the first pixel.

2. The method of claim 1,
    wherein determining that the first pixel in the depth image corresponds to the at least part of the body comprises determining a first probability that the first pixel in the depth image corresponds to the at least part of the body, and
    wherein determining that the second pixel in the depth image corresponds to the at least part of the body comprises: determining that the second pixel in the depth image corresponds to the at least part of the body based on the angle and the distance of the second pixel relative to the first pixel, and the first probability.

3. The method of claim 2, further comprising:
    determining that a third pixel in the depth image has a zero probability of corresponding to the at least part of the body based on the third pixel having a depth value associated with a background.

4. The method of claim 1, further comprising:
    selecting a third pixel among a plurality of pixels in the depth image for determination of whether the third pixel corresponds to the at least part of the body based on determining that the second pixel in the depth image corresponds to the at least part of the body, and based on an angle and a distance of the third pixel relative to the second pixel.

5. The method of claim 1, further comprising:
    determining the angle and the distance of the second pixel relative to the first pixel based on a decision tree.

6. The method of claim 1, further comprising:
    determining the angle and the distance of the second pixel relative to the first pixel invariantly with respect to depth.

7. The method of claim 1, wherein determining that the second pixel in the depth image corresponds to the at least part of the body comprises:
    determining that the second pixel in the depth image corresponds to the at least part of the body based on the angle and the distance of the second pixel relative to the first pixel, and a depth value of the first pixel.

8. A system for determining a position of at least part of a body, comprising:

computing memory bearing instructions that, upon execution by one or more processors, cause the system at least to:
receive a depth image that includes at least part of the body;
determine that a first pixel in the depth image corresponds to the at least part of the body; and
determine that a second pixel in the depth image corresponds to the at least part of the body based on an angle and a distance of the second pixel relative to the first pixel.

9. The system of claim 8,
wherein the memory further bears instructions that, upon execution by the processor, cause the system at least to:
select the second pixel among a plurality of pixels in the depth image for determination of whether the second pixel corresponds to the at least part of the body based on determining that the angle and distance of the second pixel relative to the first pixel is below a threshold amount.

10. The system of claim 9,
wherein the threshold amount would increase where a depth value associated with the first pixel were to decrease.

11. The system of claim 8,
wherein the memory further bears instructions that, upon execution by the processor, cause the system at least to:
determine a centroid pixel of the at least part of the body based on the first pixel and the second pixel.

12. The system of claim 11,
wherein the memory further bears instructions that, upon execution by the processor, cause the system at least to:
determine a location of a joint of the at least part of body based on the centroid pixel.

13. The system of claim 8,
wherein the instructions that, upon execution by the processor, cause the system at least to determine that the first pixel in the depth image corresponds to the at least part of the body further cause the system at least to determine a first probability that the first pixel in the depth image corresponds to the at least part of the body, and
wherein the instructions that, upon execution by the processor, cause the system at least to determine that the second pixel in the depth image corresponds to the at least part of the body further cause the system at least to: determine that the second pixel in the depth image corresponds to the at least part of the body based on the angle and the distance of the second pixel relative to the first pixel, and the first probability.

14. The system of claim 13,
wherein the memory further bears instructions that, upon execution by the processor, cause the system at least to:
determine that a third pixel in the depth image has a zero probability of corresponding to the at least part of the body based on the third pixel having a depth value associated with a background.

15. A computer-readable storage device that is not only a propagating signal comprising computer-executable instructions that, upon execution on a computing system, cause the computing system to perform operations comprising:
receiving a depth image that includes at least part of a body;
determining that a first pixel in the depth image corresponds to the at least part of the body; and
determining that a second pixel in the depth image corresponds to the at least part of the body based on an angle and a distance of the second pixel relative to the first pixel.

16. The computer-readable storage device of claim 15,
wherein determining that the first pixel in the depth image corresponds to the at least part of the body comprises determining a first probability that the first pixel in the depth image corresponds to the at least part of the body, and
wherein determining that the second pixel in the depth image corresponds to the at least part of the body comprises: determining that the second pixel in the depth image corresponds to the at least part of the body based on the angle and the distance of the second pixel relative to the first pixel, and the first probability.

17. The computer-readable storage device of claim 16, further comprising computer-executable instructions that, upon execution on a computing system, cause the computing system to perform operations comprising:
determining that a third pixel in the depth image has a zero probability of corresponding to the at least part of the body based on the third pixel having a depth value associated with a background.

18. The computer-readable storage device of claim 16, further comprising computer-executable instructions that, upon execution on a computing system, cause the computing system to perform operations comprising:
selecting a third pixel among a plurality of pixels in the depth image for determination of whether the third pixel corresponds to the at least part of the body based on determining that the second pixel in the depth image corresponds to the at least part of the body, and based on an angle and a distance of the third pixel relative to the second pixel.

19. The computer-readable storage device of claim 16, further comprising computer-executable instructions that, upon execution on a computing system, cause the computing system to perform operations comprising:
selecting the second pixel among a plurality of pixels in the depth image for determination of whether the second pixel corresponds to the at least part of the body based on determining that the angle and distance of the second pixel relative to the first pixel is below a threshold amount.

20. The computer-readable storage device of claim 19, wherein the threshold amount would increase where if a depth value associated with the first pixel were to decrease.

* * * * *